(12) United States Patent
Casanova et al.

(10) Patent No.: US 7,396,313 B2
(45) Date of Patent: Jul. 8, 2008

(54) PLANETARY GEAR TRAIN TRANSMISSION

(75) Inventors: Pierre Casanova, Montargis (FR);
Nicolas Pichon, Saint Martin d'Ordon
(FR); Bruno Grandjean, Fontainebleau
(FR)

(73) Assignee: REDEX, Ferrieres (FR)

( * ) Notice: Subject to any disclaimer, the term of this patent is extended or adjusted under 35 U.S.C. 154(b) by 147 days.

(21) Appl. No.: 11/315,127

(22) Filed: Dec. 23, 2005

(65) Prior Publication Data
US 2006/0142113 A1 Jun. 29, 2006

(30) Foreign Application Priority Data
Dec. 23, 2004 (FR) .................................. 04 13821

(51) Int. Cl.
*F16H 57/08* (2006.01)
(52) U.S. Cl. ....................................... 475/331
(58) Field of Classification Search ................. 475/331, 475/343, 348; 384/540, 517
See application file for complete search history.

(56) References Cited
U.S. PATENT DOCUMENTS
2,956,451 A 10/1960 Bowman 3,858,942 A * 1/1975 Humlong .................. 301/110.5
5,647,816 A * 7/1997 Michioka et al. ............ 475/285
6,890,282 B2 * 5/2005 Oberstarr ..................... 475/323

FOREIGN PATENT DOCUMENTS
| DE | 26 49 949 | 11/1977 |
| DE | 29 13 039 | 10/1980 |
| DE | 101 23 548 | 12/2001 |
| DE | 101 25 148 | 10/2002 |
| EP | 0 296 376 | 12/1988 |

* cited by examiner

*Primary Examiner*—Sherry Estremsky
*Assistant Examiner*—Edwin A Young
(74) *Attorney, Agent, or Firm*—Young & Thompson

(57) ABSTRACT

A planetary gear train transmission includes:
an outer case fitted with a ring gear having internal teeth;
at least one outlet planet carrier having planet gears meshing with the ring gear, and with a central, sun gear;
an inlet gear and an inlet bearing provided in the case; and
an outlet bearing from the transmission provided in the case;
the transmission including an outlet member coupled to rotate with the outlet planet carrier and co-operating with the planet carrier to form elements for preloading the outlet bearing.

9 Claims, 2 Drawing Sheets

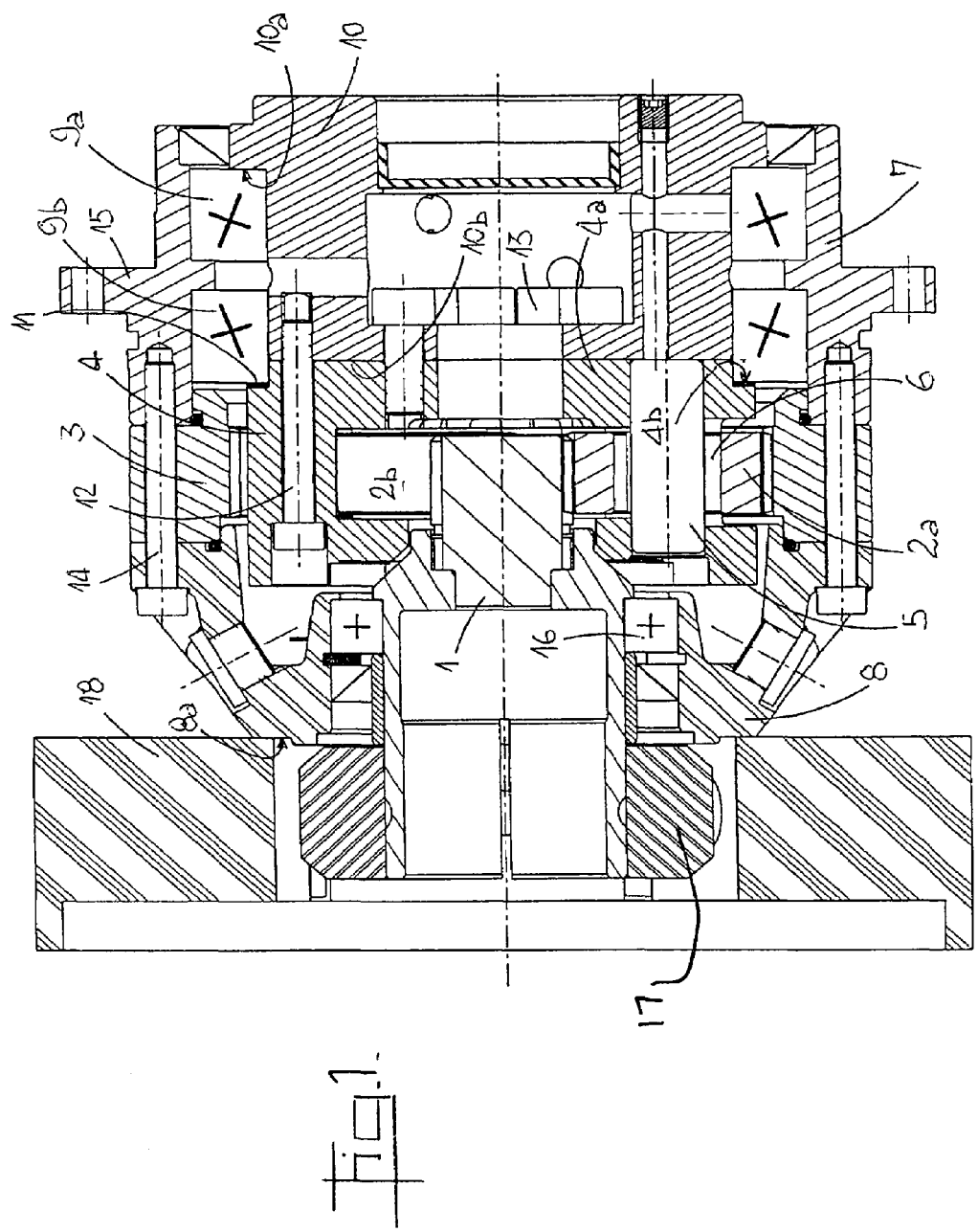

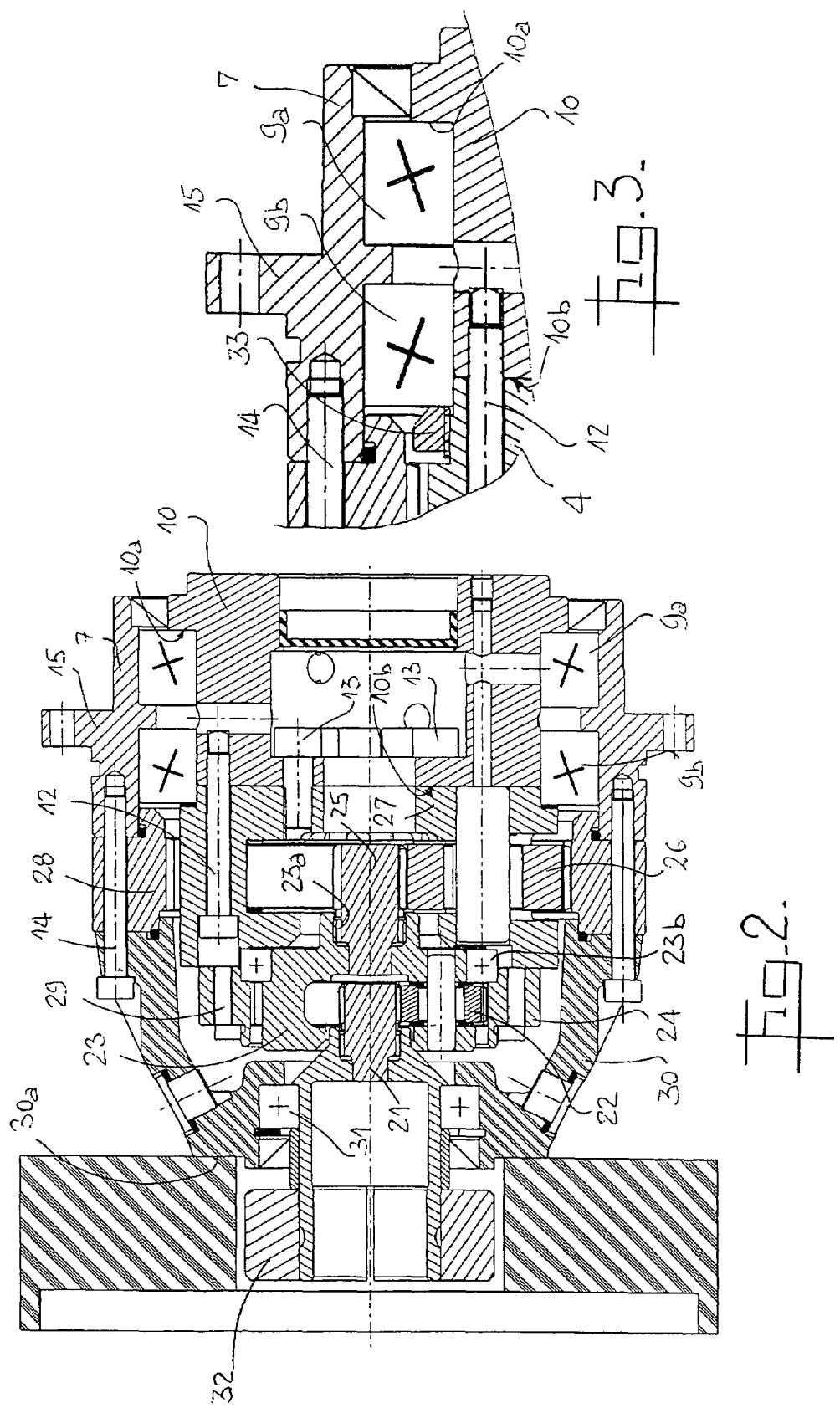

PLANETARY GEAR TRAIN TRANSMISSION

BACKGROUND OF THE INVENTION

The field of transmissions is well known, in particular concerning rotary machines and machine tools.

The most compact transmissions are generally made from one or two stages of planetary gears depending on the gear ratio that it is desired to obtain (for equal or comparable power transmission), each stage or each gear train comprising a sun gear meshing with planet gears carried by a planet carrier, which planet gears also mesh with an outer ring gear having internal teeth. The sun gear, the ring gear, and the planet carrier constitute elements of the transmission suitable for being connected externally, i.e. to the transmission line, with the gearing thus subdividing the transmission line into an upstream portion generally coming from a motor and a downstream portion which comprises a driven member of the transmission, i.e. a member that is driven at a speed of rotation applied with a given torque, this member generally also being a rotary machine (a machine tool, a roller, the screw of a press, . . . ).

The transmission also comprises an outer case containing the gearing and it too co-operates with the supports, cases, and housings of upstream and downstream portions of the transmission line. Finally, the planet carrier (or one of the planet carriers) is mounted to rotate inside the outer case by means of roll or ball bearings that require assembly or clamping means to be implemented in order to achieve axial positioning of the bearing assembly, usually under stress.

These assembly means form members that are additional to the strictly functional parts of the transmission, and constitute a factor that increases the cost price. Furthermore, such a structure requires initial assembly and needs to be monitored throughout the use of the transmission, thereby likewise constituting a drawback that needs to be remedied.

Furthermore, a manufacturer of transmissions must be capable of satisfying demand from a variety of rotary machine manufacturers that make transmission lines from components coming from a plurality of suppliers, or using components that they make themselves, depending on the machine and its shape. It is therefore necessary to make transmissions almost as custom-made items, which is not very compatible with seeking to rationalize the manufacture of transmissions in order to reduce their cost.

OBJECT OF THE INVENTION

The present invention proposes a solution that is constructive in the sense that it enables transmissions to be rationalized by separating the transmission function with its gear ratio from the function of centering and securing the transmission so as to enable it to be integrated in a transmission line where it needs to comply with the geometrical constraints of said line that apply to the transmission regardless of the gear ratio it implements. In addition, by its architecture, the transmission of the present invention is built from a small number of component elements, and when a range of transmissions is provided, it enables parts for one size of the transmission to be reused for another size, having the same gear ratio, thereby reducing the amount of the stocks that need to be held.

BRIEF DESCRIPTION OF THE INVENTION

To this end, in a first aspect, the invention provides a planetary gear train transmission comprising:

an outer case fitted with a ring gear having internal teeth;

at least one outlet planet carrier having planet gears meshing with said ring gear, and with a central, sun gear;

an inlet gear and an inlet bearing provided in the case; and an outlet roll or ball bearing from the transmission provided in the case, in which the transmission includes an outlet member coupled to rotate with the outlet planet carrier and co-operating with the planet carrier to form means for preloading the outlet bearing.

The outlet member is adapted to match the downstream portion of the transmission line and, in order to be coupled thereto, it can take on any appropriate shape even through it remains in a standardized configuration concerning its portion that co-operates both with the planet carrier and with the outlet bearing.

In a preferred embodiment, the case includes a case element distinct from the ring gear, and said case element carries the outlet bearing of the transmission.

Thus, for a given gear ratio and a given level of power to be transmitted, the structure of the transmission, concerning its gearing, can be rationalized regardless of the transmission line in which the transmission is to be placed. The means that enable its axial length to be adjusted and that are fitted to the segments of the transmission line upstream and downstream from the transmission can be themselves "custom" items so as to be suitable for matching the transmission line and they form a personalized interface enabling the transmission to be adapted to the requirements of the application.

Advantageously, the case element, the outlet bearing, and the outlet member constitute a preassembled subassembly of the transmission in which the axial dimension suitable for preloading the bearing is adjusted by an annular spacer of appropriate thickness for each subassembly and situated beside its connection with the outlet planet carrier. This characteristic contributes to rationalizing manufacture. The greatest dimensional variations are those concerning the axial length of the bearings received in the case element, particularly if the bearings are conical roller bearings. The annular spacer enables these variations to be compensated and makes it possible for final assembly to be performed using a subassembly that matches the outlet planet carrier and that can be manufactured in a thoroughly controlled manner.

A second aspect of the invention lies in providing a range of two-stage transmissions, the range possessing at least three sizes for a given gear ratio, such that for the transmissions of sizes greater than the smallest size, at least the central, sun gear, the planet gears, their journals, and the ring gear of the inlet gear train are identical to those of the outlet gear train of a smaller size.

Other characteristics and advantages of the invention appear from the description given below of two non-limiting embodiments.

BRIEF DESCRIPTION OF THE DRAWINGS

Reference is made to the accompanying drawings, in which:

FIG. 1 is an axial section view of a transmission in accordance with the invention having a single reduction stage;

FIG. 2 is an axial section view of a transmission in accordance with the invention having two reduction stages; and FIG. 3 is a fragmentary section view of a variant embodiment of the invention replacing the above-mentioned annular spacer.

DETAILED DESCRIPTION OF THE INVENTION

The transmission shown in FIG. 1 is a transmission having one planetary train or stage. It comprises a sun gear 1, planet gears 2a, 2b, and an outer ring 3 with internal teeth, such that the planet gears 2a, 2b mesh both with the sun gear 1 and with the outer ring 3. The planet gears 2a, 2b (in fact there are three planet gears between the sun gear and the ring) are carried by a planet carrier 4 by means of journals 5 and needle bearings 6.

The transmission includes an outer case which comprises the outer ring 3, a first case element 7, and a second case element 8.

The first case element 7 is in the form of a tubular sleeve forming the outer ring of a conical roller bearing 9a, 9b which forms the outlet bearing of the transmission. This bearing supports an outlet member gear from the transmission which forms the means for coupling the planet carrier 4 to the downstream portion of the transmission line (not shown). This member includes a shoulder 10a which constitutes axial bearing means for the inner ring of the bearing 9a.

The face 10b of the member 10 via which it is coupled to the planet 4 is set back inside the inner ring of the bearing 9b so that a nose 4a of the planet carrier 4 can penetrate into said ring. This nose 4a co-operates with the planet carrier body 4 to define a radial shoulder 4b.

The inner ring of the bearing 9b carries an annular spacer 11 which is fitted (e.g. by adhesive or magnetic attraction or by any other means) on the axial end of said bearing ring remote from the inner ring of the other bearing 9a. This spacer serves to adjust the axial dimensions of the bearing measured from the shoulder 10a, firstly to accommodate for dimensional differences observed at the bearings from one assembly to another (several tenths of a millimeter), and secondly to determine the preloading on the bearing when the planet carrier 4 is being assembled with the outlet member 10 by means of screws 12 and screws 13 that serve to transmit torque between these two parts. The sleeve element 7 is secured to the ring gear 3 by screws 14, and in the present example it possesses a flange 15 enabling it to be secured to a stationary structure of the transmission line.

The second outer case element 8 is in the form of a second conical tubular sleeve secured to the ring gear 3 by a plurality of screws (in this case the screws 14), this sleeve constituting the outside wall of a ball bearing 16 for centering a coupling part 17 that is used for connecting the sun gear 1 in rotation with a shaft (not shown). As is conventional in the field, this coupling part is shown as a sleeve for clamping onto the shaft that is for connection to the sun gear 1, which possesses fluting that co-operates with complementary fluting on the part 17.

A planetary gear transmission possesses three elements for connection with the external environment: the sun gear, the planet carrier, and the ring gear. By causing two of the three elements to rotate at respective speeds of rotation, the third element has a speed of rotation that is determined by the internal gear ratio of the transmission and by the two speeds of rotation imparted to the transmission. Generally, the speed of the ring gear is equal to zero, with a drive speed being applied to the sun gear or to the planet carrier, and with a different, driven speed being taken either from the planet carrier or from the sun gear.

It will be understood that in the embodiment shown in FIG. 1, the sleeve 8 has all of the means for interfacing the transmission, e.g. with the upstream portion of the transmission line. Thus the part 17 matches the diameter of the shaft it is to receive and is coupled with the sun gear, while the front face of the sleeve 8 possesses a shoulder 8a of dimensions adapted to obtain a match with any fastening flange such as 18 that might exist on the transmission line upstream from the planetary gear transmission.

In the same manner, the tubular sleeve 7 as shown in the figure possesses the flange 15 for enabling it to be held stationary and thus hold the ring gear 3 stationary relative to support parts of the transmission line. This sleeve 7 may in any event posses other external means enabling it to co-operate with the transmission line in which it is to be included. For example, without going beyond the ambit of the invention, the flange 15 on the sleeve 7 may be replaced by a pulley or by a gear ring having outwardly-directed teeth suitable for meshing with a gearwheel for adjusting or servo-controlling the gear ratio of the transmission to an external reference.

From the above, it can be understood that the transmission shown in FIG. 1 is very easy to assemble. Starting from a preassembled subassembly 7, 9a, 9b, 10, and 11, the planet gears 2a and 2b and their journals 5 are placed in the planet carrier 4, which is screwed to the sleeve 10 by the screws 12 and 13 thus providing axial preloading (or prestress) for the bearings 9a, 9b in the manner determined by the spacer 11. Thereafter the planet gears are received in the ring gear 3 and the sleeve 8, together with its bearing and the sun gear 1 inserted in the center of the planet gears 2a, 2b, is put into place and the assembly is held together axially by the screws 14.

FIG. 2 shows a transmission in accordance with the invention that has two stages. One of the stages comprises a sun gear 21 meshing with planet gears 22 carried by a planet carrier 23, the planet gears 22 also meshing with an outer ring gear 24.

The planet carrier 23 is coupled in rotation by fluting 23a to a second sun gear 25 which meshes with planet gears such as 26 carried by a planet carrier 27, the gears 26 also meshing with a ring gear 28. The planet carrier 27 is also constrained to rotate with the ring gear 24 of the outer transmission stage. Screws 29 provide this connection between the ring gear 24 and the planet carrier 27. A ball bearing 23b is provided between the planet carrier 23 and the assembly comprising the planet carrier 27 and the ring 24.

As in the preceding figure, there is the first case element 7 with its bearings 9a, 9b, the spacer 11, the outlet member 10, . . . as described above with the element 7 being connected by the screws 14 to the ring gear 28 and with the outlet member 10 being connected to the planet carrier 27 by the screws 12 and 13.

The second case element, here referenced 30, is longer in the axial direction than the element 8, and includes as before a support bearing 31 for the part 32 for coupling the sun gear 28 to a shaft, e.g. an inlet shaft belonging to the transmission line, said sleeve 30 also presenting a shoulder 30a for fitting to a fastener flange forming part of the upstream portion of the transmission line. The sleeve 30 is secured to the ring 28 by the screws 14.

This two-stage architecture for the transmission makes it possible to construct a range of transmissions having a given transmission ratio and comprising at least three sizes, each of the sizes being adapted to a maximum power that is to be transmitted, and in which range the inlet planetary train, i.e. the first stage, corresponds to the outlet planetary train of the transmission of a next smaller size, with the exception of the first size, i.e. the smallest size, for which there is no smaller size.

In other words, if the transmission shown in FIG. 2 is considered as corresponding to a transmission of size three in a range having a given ratio, the planet gears 22, the journals 26, and the sun gear 21 correspond respectively to the planet gears 2a, 2b, to the journals, and to the sun gear 25, i.e. to the gears forming the outlet planetary train of the transmission of the next smaller size in the range. The ring gear 24 is in fact the ring gear 28 of said smaller size, axially reversed.

The ability to make such combinations constitutes a significant saving in terms of manufacturing such transmission. In addition, by making it possible to reduce the number of different parts that need to be held in stock, it makes it possible to respond more quickly to market demand and at lower cost, since for a given quantity of transmissions, identical parts are manufactured in greater numbers. Finally, the subassembly formed by the parts 7, 9a, 9b, 10, and 11 is preassembled and tested upstream from any final assembly made in response to a specific order, thus making it possible considerably to reduce the time required for making a transmission and thus the time required for satisfying an order.

In a variant embodiment of the invention (shown in FIG. 3), the spacer ring 11 can be replaced by a nut 33 screwed onto the outlet planet carrier 4. The planet carrier 4 and the member 10 are assembled together by the screws 12 and 13, and then the axial preload or prestress on the rolling bearings 9a, 9b is adjusted by controlled turning of the nut 33.

What is claimed is:

1. A planetary gear train transmission, comprising:
   an outer case fitted with a ring gear having internal teeth;
   at least one outlet planet carrier having planet gears meshing with said ring gear, and with a central, sun gear;
   an inlet gear and an inlet bearing provided in the case; and
   an outlet roll or ball bearing from the transmission provided in the case;
   wherein the transmission includes an outlet member coupled to rotate with the outlet planet carrier and cooperating with the planet carrier to form means for preloading the outlet bearing.

2. A transmission according to claim 1,
   wherein the case includes a case element distinct from the ring gear,
   said case element carrying the outlet bearing of the transmission, and
   wherein the case element, the outlet bearing, and the outlet member constitute a preassembled subassembly of the transmission in which the axial dimension suitable for preloading the outlet bearing is adjusted by an annular spacer of appropriate thickness for the subassembly and situated beside its connection with the outlet planet carrier.

3. A transmission according to claim 1, wherein the outlet planet carrier includes a nut for preloading the outlet bearing.

4. A transmission according to claim 1, wherein the inlet bearing is carried by a second case element assembled with the ring gear on the side of the ring gear remote from a first case element.

5. A planetary gear train transmission according to claim 1, wherein the central, sun gear and the inlet gear are a single gear and the planetary gear train transmission is a one-stage planetary gear train transmission.

6. A planetary gear train transmission according to claim 1, wherein the central, sun gear is constrained to rotate with a planet carrier of an inlet planetary gear train possessing a ring gear constrained to rotate with the outlet planet carrier having planet gears meshing with the central, sun gear that is the inlet gear and the planetary gear train transmission is a two-stage planetary gear train transmission.

7. A set of transmissions according to claim 6,
   each of the transmissions of the set having the same given gear ratio,
   a first transmission of the set being a first size,
   a second transmission of the set being a second size greater than the first size,
   a third transmission of the set being a third size greater than the second size,
   for the second transmission and the third transmission, at least the central, sun gear, the planet gears, their journals, and the ring gear of the inlet gear train are identical to those of the outlet gear train of the first transmission.

8. A transmission according to claim 1,
   wherein a nose portion of the planet carrier penetrates an inner ring of the outlet bearing to define a radial shoulder on the nose portion.

9. A planetary gear train transmission, comprising:
   a pre-assembled subassembly, including a first case element (7) forming an outer ring of an outlet bearing (9), the outlet bearing supporting an outlet member (10), and an annular spacer (11) on a first axial end of the outlet bearing;
   a second case element fitted with a ring gear (3) having internal teeth;
   an outlet planet carrier (4) having planet gears; and
   a sun gear, wherein,
   the planet carrier and the planet gears are fitted to the outlet member of the subassembly to provide axial preloading to the outlet bearing in a manner determined by a thickness of the annular spacer,
   the planet gears are received in the ring gear,
   the sun gear is fitted in the center of the planet gears, and
   the outlet member and the planet carrier are held together axially by at least one fastener internal to the sub-assembly.

* * * * *